(12) United States Patent
Yang et al.

(10) Patent No.: US 8,044,152 B2
(45) Date of Patent: Oct. 25, 2011

(54) EPOXY RESIN CONTAINING SIDE-CHAIN-TETHERED CAGED POSS AND PREPARATION METHOD THEREOF AS WELL AS EPOXY RESIN MATERIAL CONTAINING POSS-EPOXY AND PREPARATION METHOD THEREOF

(75) Inventors: Cheng-Chien Yang, Longtan Township, Taoyuan County (TW); Chen-Chi M. Ma, Hsinchu (TW); Wang-Tsae Gu, Longtan Township, Taoyuan County (TW); Chin-Yih Chen, Longtan Township, Taoyuan County (TW)

(73) Assignee: Chung Shan Institute of Science and Technology, Armaments Bureau, M.N.D, Taoyuan County (TW)

( * ) Notice: Subject to any disclaimer, the term of this patent is extended or adjusted under 35 U.S.C. 154(b) by 409 days.

(21) Appl. No.: 12/247,335

(22) Filed: Oct. 8, 2008

(65) Prior Publication Data
US 2010/0087616 A1    Apr. 8, 2010

(51) Int. Cl.
*C08G 77/42* (2006.01)
(52) U.S. Cl. .......................... 525/474; 528/88
(58) Field of Classification Search .................. 525/474; 528/88
See application file for complete search history.

(56) References Cited

U.S. PATENT DOCUMENTS

| | | | | |
|---|---|---|---|---|
| 2,891,927 A | * | 6/1959 | Philipson | 528/120 |
| 3,794,619 A | * | 2/1974 | Hasegawa et al. | 528/97 |
| 6,425,936 B1 | * | 7/2002 | Sammons et al. | 95/45 |

OTHER PUBLICATIONS

Abstract of Fayna et al., Material Research Society Symposium Proceedings 847 (2005) 363-368.*
Odian, Principles of Polymerization, $2^{nd}$ Ed., Wiley-Interscience, 1981, pp. 136-138.*
Lichtenhan "Polyhedral oligomeric silsesquioxanes: Building blocks for silsesquioxane-based polymers and hybrid materials" Comments on Inorganic Chemistry, 17(2) (1995) 115-130.*

* cited by examiner

*Primary Examiner* — Kuo-Liang Peng
(74) *Attorney, Agent, or Firm* — Ming Chow; Sinorica, LLC

(57) ABSTRACT

An epoxy resin containing side-chain-tethered caged POSS and a preparation method thereof as well as epoxy resin material containing POSS-epoxy and a preparation method thereof are disclosed. The epoxy resin containing side-chain-tethered caged POSS (POSS epoxy) is formed by tethering of POSS group to the side chain of the diglycidyl ether of bisphenol A (DGEBA) epoxy resin. The preparation method of the POSS epoxy includes a step of reacting epoxy resin with caged POSS to form epoxy resin containing side-chain-tethered caged POSS (POSS-epoxy). The preparation method of epoxy resin material containing POSS-epoxy includes a step of reacting DGEBA epoxy resin with POSS-epoxy to get epoxy resin material containing POSS-epoxy. The POSS-epoxy is distributed evenly in the epoxy resin material with POSS-epoxy.

13 Claims, 20 Drawing Sheets reacting epoxy resin with caged POSS o form epoxy resin ~S1

Fig. 1

EPOXY RESIN CONTAINING SIDE-CHAIN-TETHERED CAGED POSS AND PREPARATION METHOD THEREOF AS WELL AS EPOXY RESIN MATERIAL CONTAINING POSS-EPOXY AND PREPARATION METHOD THEREOF

BACKGROUND OF THE INVENTION

The present invention relates to an epoxy resin material containing caged POSS and preparation method thereof, especially to the epoxy resin containing side-chain-tethered caged POSS (polyhedral oligomeric silsesquioxane) and a preparation method thereof as well as epoxy resin material containing POSS-epoxy and a preparation method thereof that are applied to various fields such as high performance adhesives, heat resistant coating, filler for home decoration, composite material, electronic material, electrical insulating materials, electronic information products, and optoelectronics.

Epoxy has features of good adhesiveness, mechanical properties and physical properties such as tensile strength, impulse durability, insulation properties and good machinability so that it is broadly applied to composite material, electronic material and electrical insulating materials.

Along with fast development of various electronic information products, and optoelectronics, features of epoxy such as light transmittance, high hardness, high gas barrier characteristics, high heat resistance and excellent dimensional stability gradually got challenged. Conventional epoxy resin material is formed by physically mixture of epoxy resin with fillers such as processed organic clay, glass fiber or other nano-scale powder. However, above fillers have disadvantages of larger particle diameter and higher density. Moreover, filler in the epoxy resin has poor dispersion and the formed epoxy resin has poor oxidation resistance, poor film forming ability and low glass transition temperature (Tg). Refer to Patent Pub. No. KR20050004563, the POSS in the material has not been polymerized so that phase separation easily occurs and distribution of POSS is not even. As to U.S. Pat. No. 7,026,013, although POSS is with epoxy group, the POSS may aggregate and distribute unevenly while crosslinking due to poor compatibility of POSS with epoxy.

Thus an epoxy resin containing side-chain-tethered caged POSS and a preparation method thereof as well as epoxy resin material containing POSS-epoxy and a preparation method thereof is provided. Because caged POSS has smaller nanoscale particle diameter and lower density so as to have better distribution in epoxy resin. Moreover, caged POSS is bonded with DGEBA epoxy resin to form caged POSS-epoxy. Then the POSS-epoxy is further added into and reacted with epoxy resin to form epoxy resin material containing POSS-epoxy that has better oxidation resistance and film forming ability while glass transition temperature (Tg) is higher.

SUMMARY OF THE INVENTION

Therefore it is a primary object of the present invention to provide an epoxy resin containing side-chain-tethered caged POSS and a preparation method thereof as well as epoxy resin material containing POSS-epoxy and a preparation method thereof. A side chain caged silsesquioxane-POSS is chemically bonded with DGEBA epoxy resin and is distributed evenly in DGEBA epoxy resin.

It is another object of the present invention to provide an epoxy resin containing side-chain-tethered caged POSS and a preparation method thereof as well as epoxy resin material containing POSS-epoxy and a preparation method thereof. The POSS-epoxy has higher glass transition temperature and thermal resistance.

It is a further object of the present invention to provide an epoxy resin containing side-chain-tethered caged POSS and a preparation method thereof as well as epoxy resin material containing POSS-epoxy and a preparation method thereof. The epoxy resin material containing POSS-epoxy has better oxidation resistance and film forming ability.

The POSS-epoxy is:

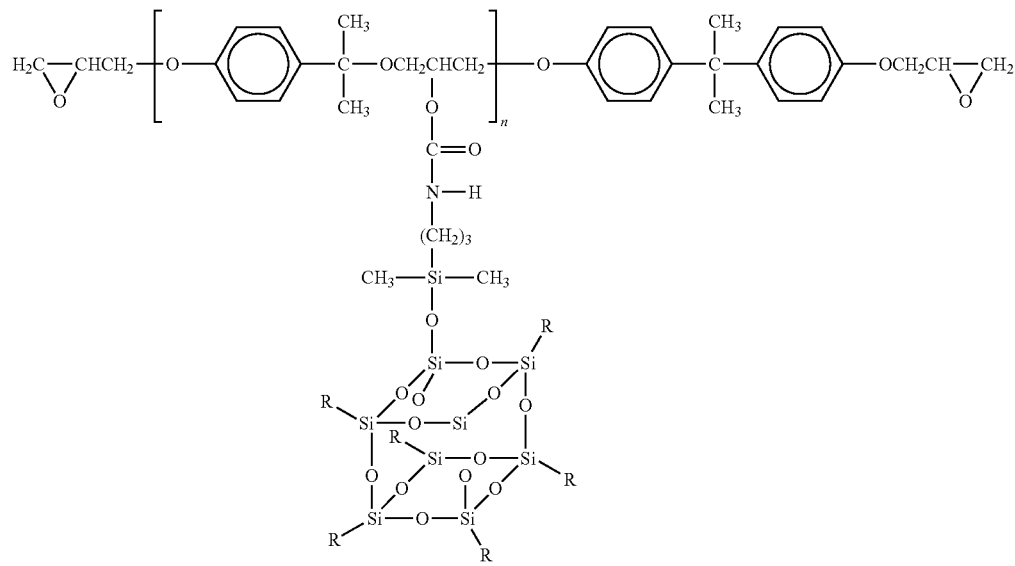

wherein n is a whole number selected from 1 to 10 while R is one of the following groups: methyl group, ethyl group, propyl group and isobutyl group. The preparation method of POSS-epoxy includes a step of reacting epoxy resin with IPI-POSS to form POSS-epoxy. The preparation method of epoxy resin material containing POSS-epoxy consists of the steps of: reacting epoxy resin with IPI-POSS to form POSS-epoxy and reacting epoxy resin with POSS-epoxy to form epoxy resin material containing POSS-epoxy.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 is a flow chart of a preparation method for POSS-epoxy according to the present invention;

DETAILED DESCRIPTION OF THE PREFERRED EMBODIMENT

An embodiment of the epoxy resin containing side-chain-tethered caged POSS according to the present invention is:

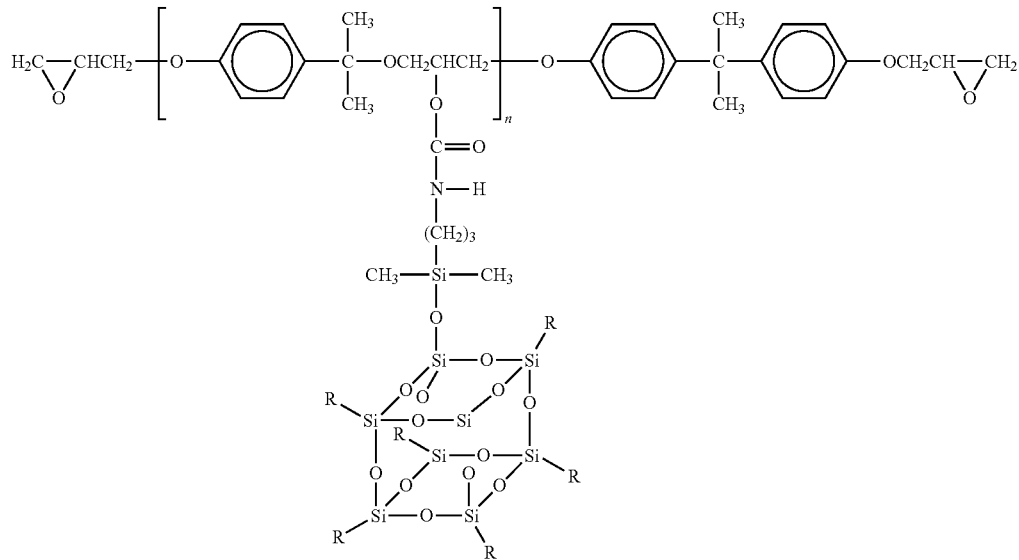

wherein n is a whole number selected from 1 to 10, R is one of the following groups: methyl group, ethyl group, propyl group and isobutyl group.

As shown in FIG. 1, a preparation method of epoxy resin containing side-chain-tethered caged POSS includes the following step:

S1 react epoxy resin with caged POSS such as isocyanato-propyldimethylsilyl-isobutyl-POSS to form epoxy resin containing side-chain-tethered caged POSS (POSS-epoxy).

Figure 2:
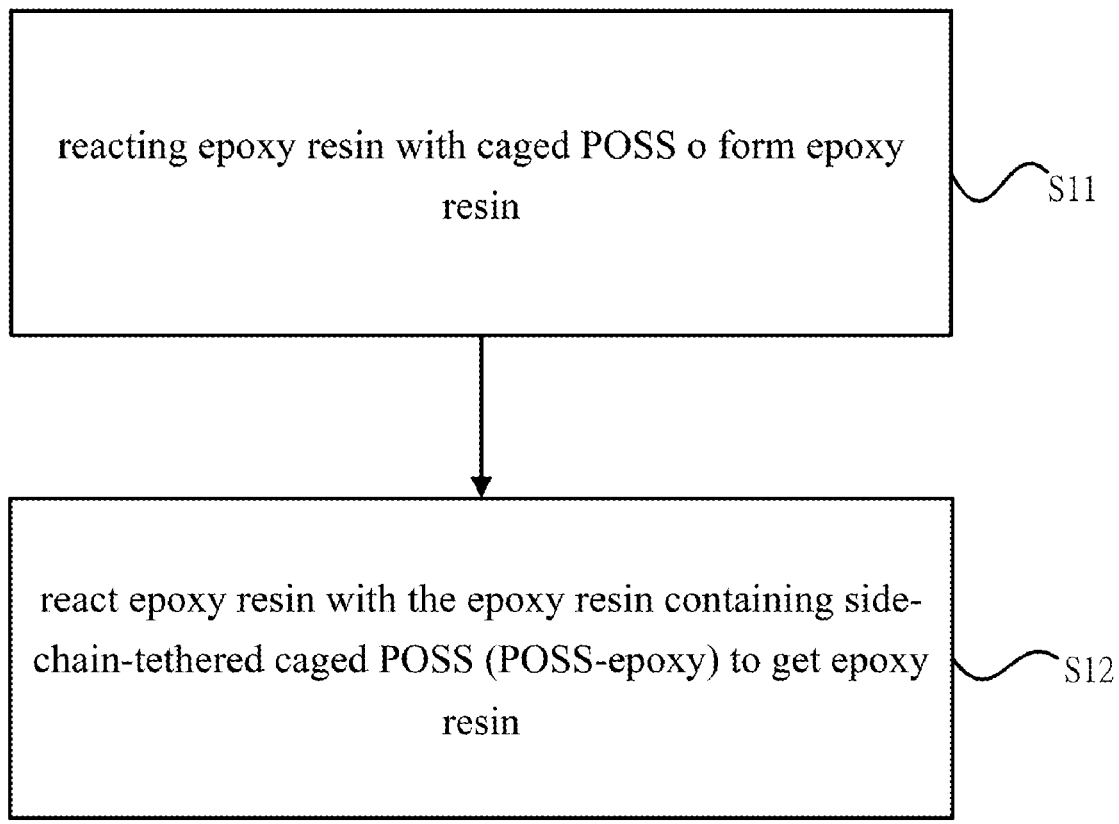
FIG. 2 is a flow chart of a preparation method for epoxy resin material containing POSS-epoxy according to the present invention.

A preparation method of epoxy resin material containing POSS-epoxy includes the following steps, as shown in FIG. 2:

S11 react epoxy resin with caged POSS such as isocyanatopropyldimethylsilyl-isobutyl-POSS to form epoxy resin containing side-chain-tethered caged POSS (POSS-epoxy); and S12 react epoxy resin with the epoxy resin containing side-chain-tethered caged POSS (POSS-epoxy) to get epoxy resin material containing POSS-epoxy.

Preparation of POSS-Epoxy

Figure 3:
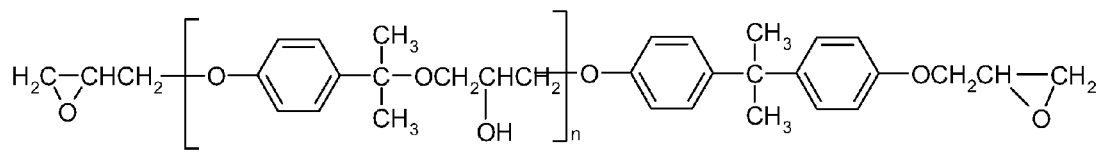
FIG. 3 is a schematic drawing showing chemical equation of IPI-POSS with DGEBA epoxy resin according to the present invention.
Figure 3:
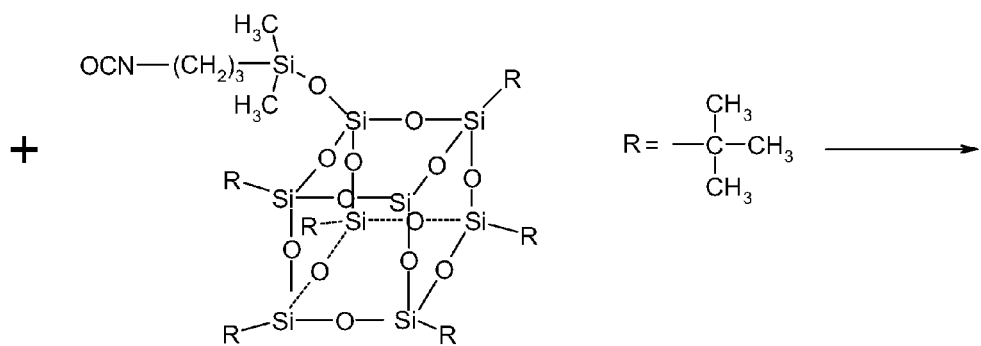
Figure 3:
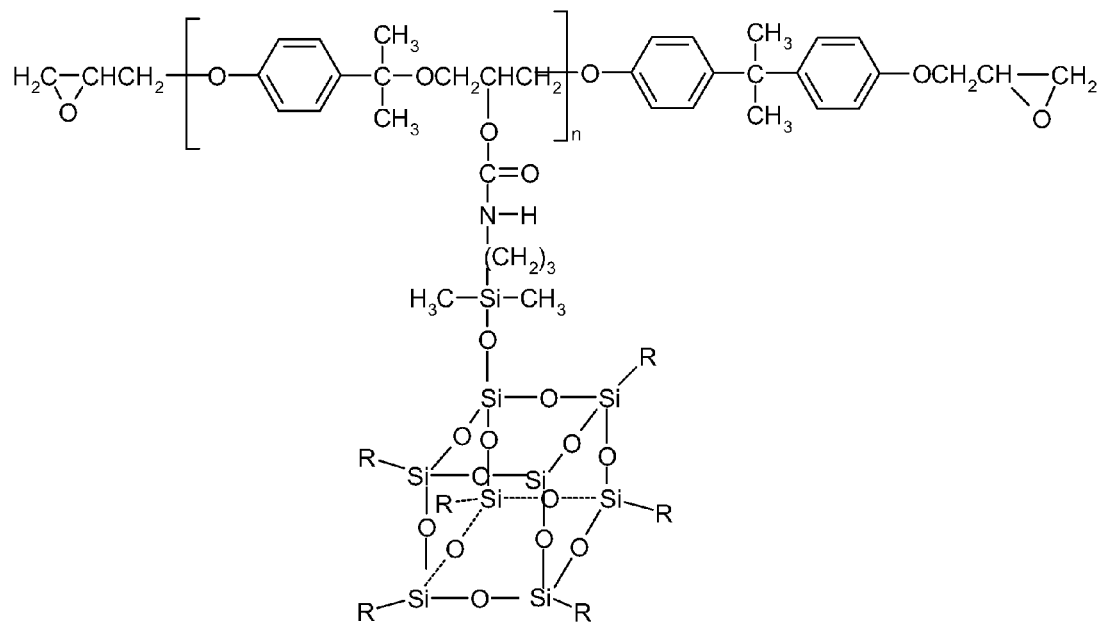

The caged POSS-isocyanatopropyldimethylsilyl-isobutyl-POSS is used to prepare POSS-Epoxy so as to make side-chain of epoxy resin connect with caged POSS and the chemical equation is shown in FIG. 3.

Embodiment One

Dissolve 10 g Diglycidyl ether of bisphenol A (DGEBA) epoxy resin with epoxide equivalent weight (EEW) of 180 g/eq in 15 g tetrahydrofuran (THF) and the solid content is 40 wt %. Then add 2 g caged polyhedral oligomeric silsesquioxane such as isocyanatopropyldimethylsilyl-isobutyl-POSS (IPI-POSS) into epoxy resin solution while weight ratio of the epoxy resin to the caged polyhedral oligomeric silsesquioxane is 5:1 so as to make NCO functional group of IPI-POSS react with a hydroxy group of the epoxy resin and triethylamine (TEA) is added and used as catalyst. The solution is stirred by a magnet under 60 degrees Celsius and using reflux to keep concentration at a certain level. Use Fourier Transform Infrared Spectrophotometer (FT-IR) to monitor functional groups change. After about 10 hours, the reaction is completed and side chain tethered caged POSS-Epoxy solution is obtained.

Figure 4:
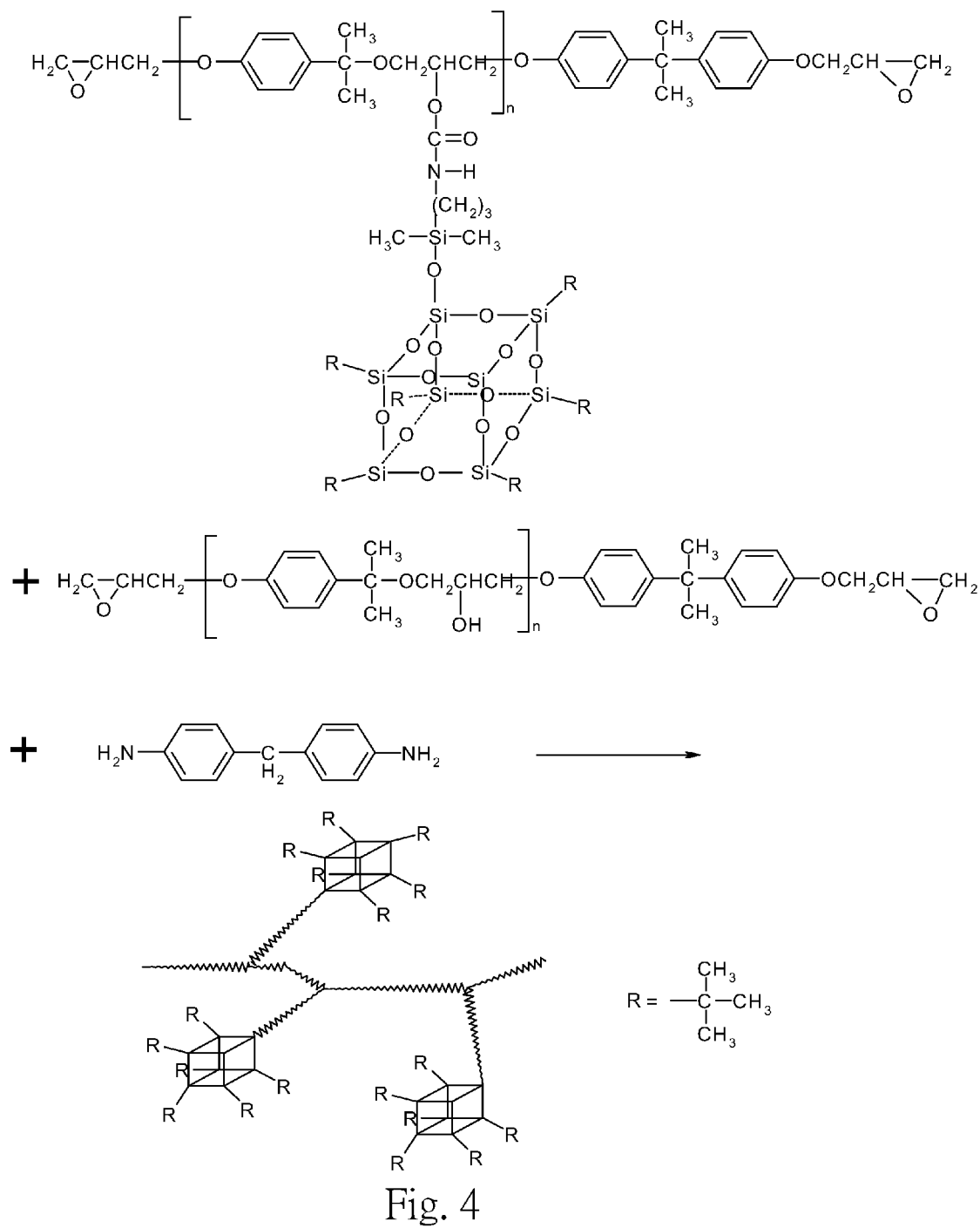
FIG. 4 is a schematic drawing showing chemical equation of POSS-epoxy with DGEBA epoxy resin according to the present invention.

Preparation of epoxy resin material containing POSS-Epoxy DGEBA epoxy resin is added with POSS-Epoxy in different ratios and is stirred at room temperature for an hour. Then add hardener-4,4'-methylenedianiline(4,4'-diaminodiphenylmethane/DDM) and put the mixture at room temperature for one day. The mixture is heated in a vacuum oven at 80° C. for 2 hrs, 120° C. for 2 hrs, 160° C. for 4 hrs and 180° C. for 6 hrs continually. The chemical equation is as shown in FIG. 4. The POSS-Epoxy according to the present invention is used as filler of the epoxy resin material containing IPI-POSS.

Embodiment Two to Eleven

Take 10 g DGEBA and add in 2.25, 11.25, 22.5, 33.75, 67.5, 112.5, 157.5 and 202.5 g POSS-Epoxy/THF solution prepared in embodiment one respectively. Now the weight ratio of DGEBA with POSS-Epoxy in the mixture is respectively 100/1, 100/5, 100/10, 100/15, 100/30, 100/50, 100/70, and 100/90. Then prepare epoxy resin material containing POSS-Epoxy according to conditions mentioned above and the test results of thermogravimetric analysis (TGA) and Limiting Oxygen Index (LOI) are shown in list 1 and list 2.

Structure Identification of POSS-Epoxy

The modified epoxy resin according to the present invention is formed by tethering caged POSS monomer to epoxy ring of DGEBA epoxy resin. While reacting, organic phase of epoxy resin is covalently bonded to inorganic phase of POSS so as to increase compatibility of POSS and epoxy. IPI-POSS is used as the modifier and a specific functional group-NCO group of the IPI-POSS reacts with a functional group-OH group of the DGEBA epoxy resin so as to form an urethane bond and silicide is on the main chain of the DGEBA epoxy resin.

Figure 5:
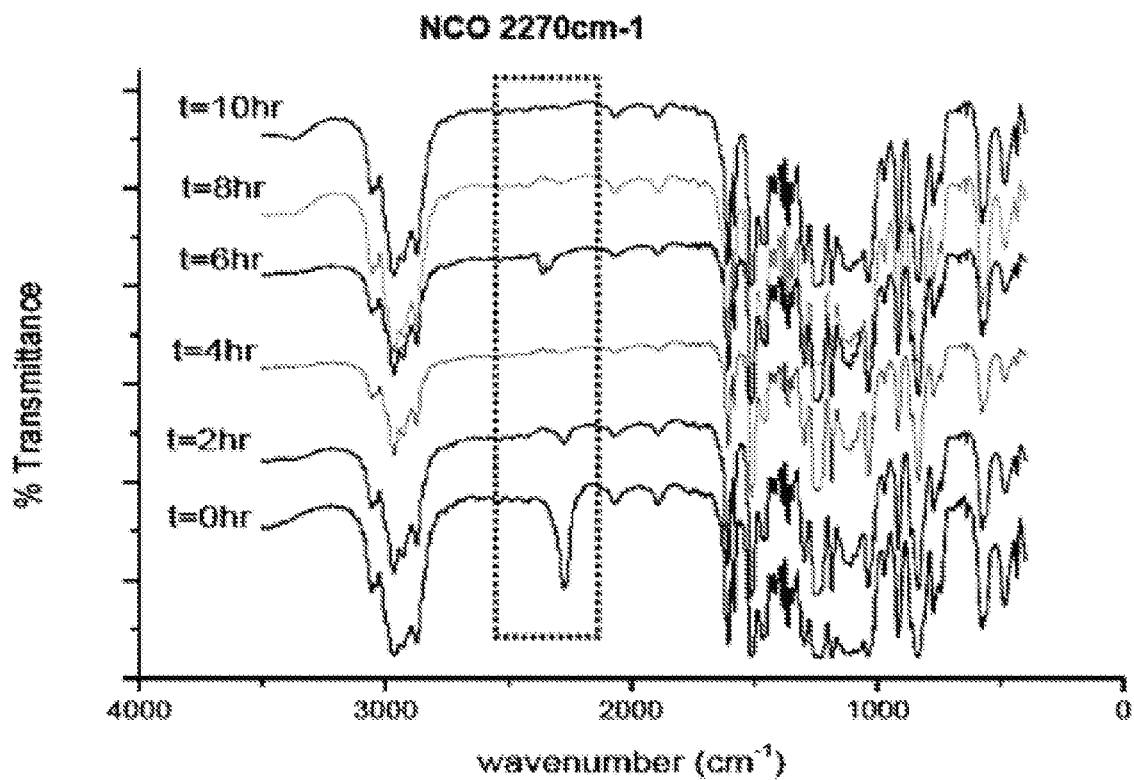
FIG. 5 is FT-IR spectra of DGEBA epoxy resin reacting with IPI-POSS according to the present invention.

In order to analyze reaction between the DGEBA epoxy resin and the coupling agent IPI-POSS, FT-IR is used to monitor NCO functional group motions. FIG. 5 is FT-IR spectra of the reaction between epoxy and IPI-POSS and change of NCO group at 2270 $cm^{-1}$ along with time is learned. From starting of the reaction, it takes about 10 hours that the peak of NCO group at 2270 $cm^{-1}$ totally disappears. This means the DGEBA epoxy resin has already reacted with the coupling agent IPI-POSS.

Figure 6:
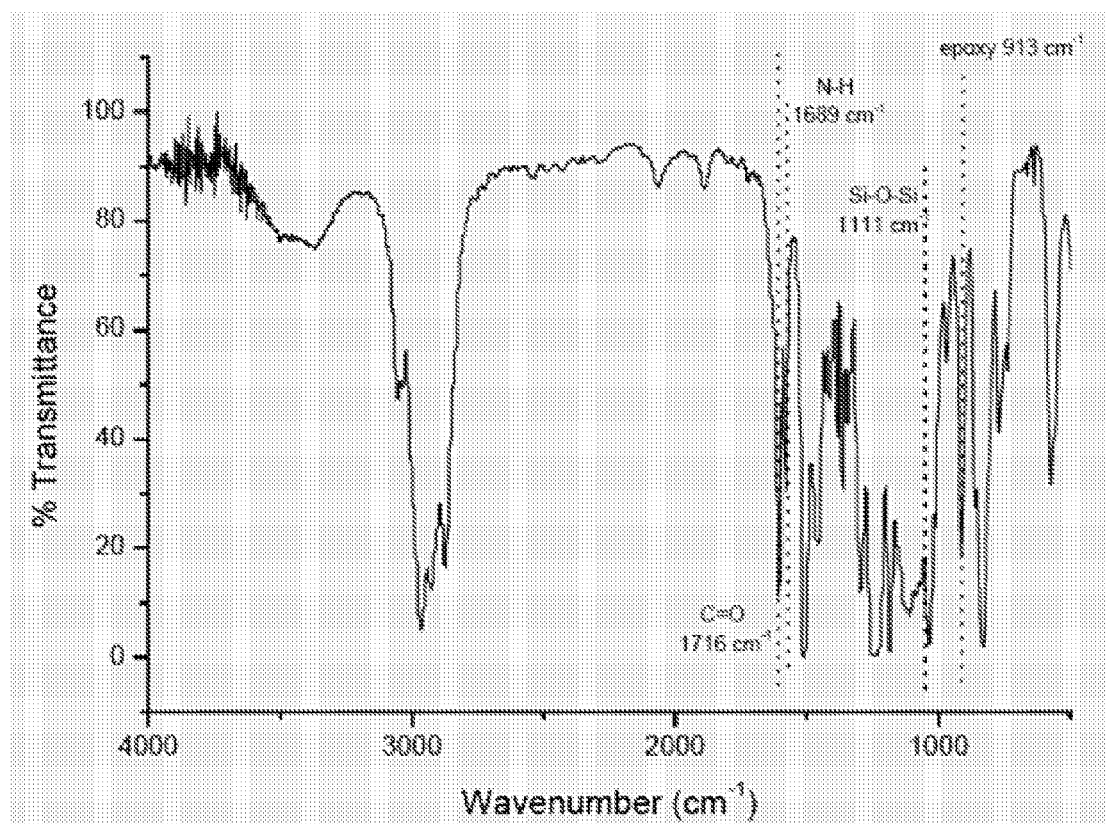
FIG. 6 is FT-IR spectrum of POSS-epoxy according to the present invention.

After being modified, the FT-IR spectrum of modified epoxy is shown in FIG. 6 and it is proved that NCO peak at 2270 $cm^{-1}$ disappears completely. The absorption peak between 1100 $cm^{-1}$ and 1200 $cm^{-1}$ is of Si—O—Si while the peak at 1726 $cm^{-1}$ is of C=O. Thus the epoxy is indeed modified and a characteristic absorption peaks at 913 $cm^{-1}$ that is a distinctive fingerprint spectrum of the epoxy group appears. This means the modified epoxy resin still keeps the epoxy group without being changed.

Figure 7:
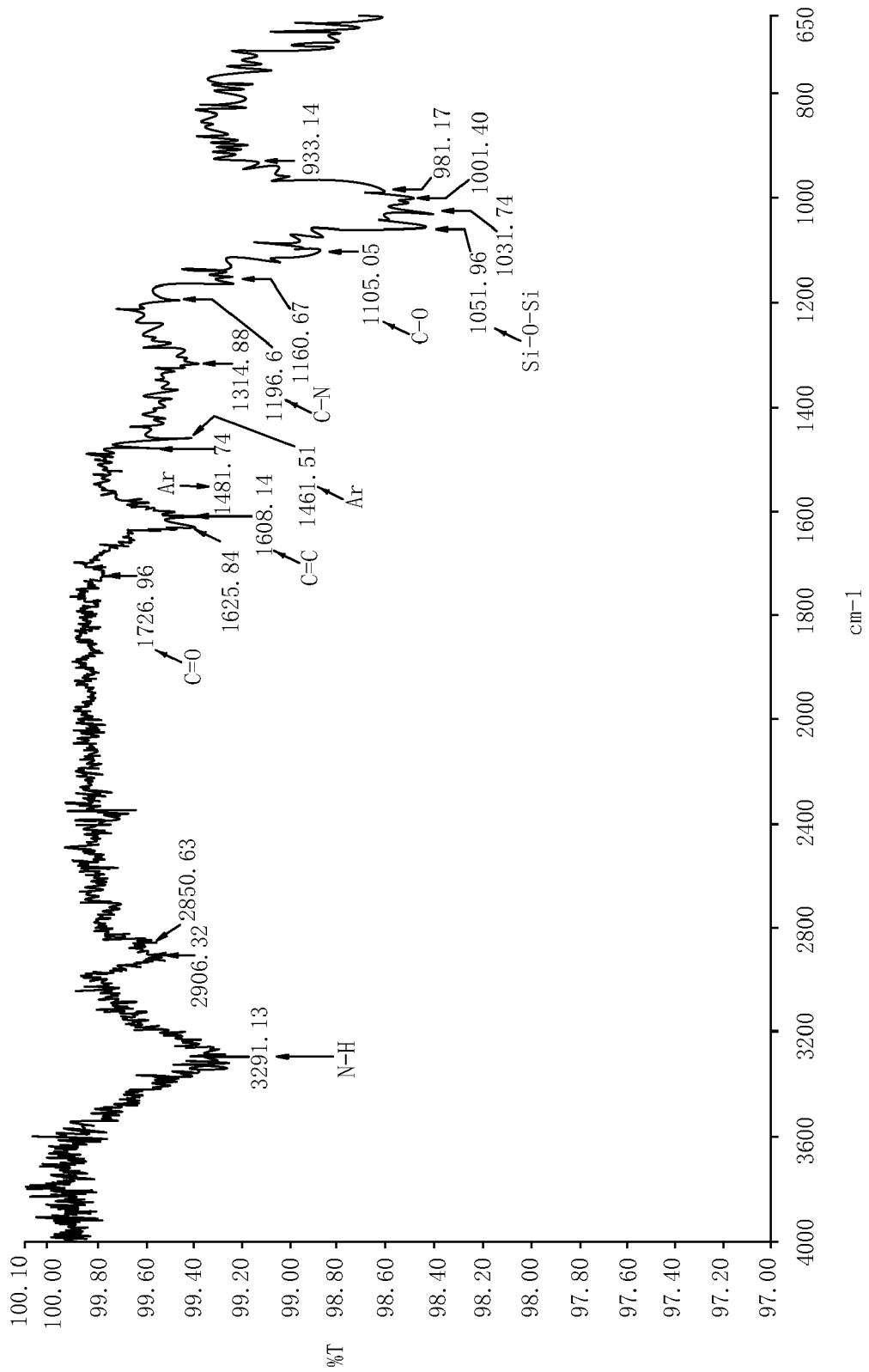
FIG. 7 is FT-IR spectrum of hardened epoxy resin material containing POSS-epoxy according to the present invention.

Structural Identification of Epoxy Resin Material Containing POSS-Epoxy FT-IR Spectroscopy It is learned from FIG. 7 that after hardening, the characteristic absorption peak of epoxy group at 914 $cm^{-1}$ disappears completely while the characteristic absorption peak of C—N appears at 1196 $cm^{-1}$ and this means DDM already reacted with epoxy group of epoxy resin. The characteristic absorption peak at 1481 $cm^{-1}$ is of benzene ring, the peak at 1608 $cm^{-1}$ is of C=C while the peak at 1314 $cm^{-1}$ represents umbrella structure of $CH_3$.

The peak at 1051 $cm^{-1}$ is of non-symmetrical Si—O—Si.

Due to the urethane bond formed by the NCO group of POSS with OH group of the epoxy resin, peaks of C=O and N—H bond appear at 1726 $cm^{-1}$ and 3291 $cm^{-1}$ while there is no absorption peak at 2270 $cm^{-1}$ and this represents the added NCO-in POSS has been reacted completely.

$^{29}$Si Solid-State NMR

Figure 8:
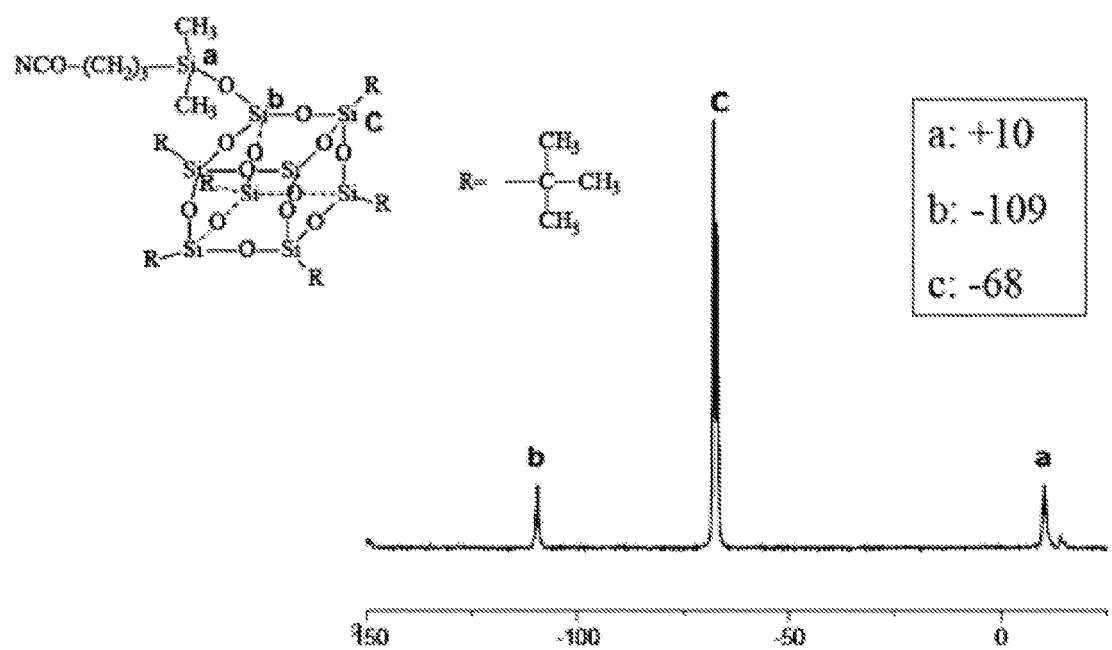
FIG. 8 is a solid state $^{29}$Si-NMR spectroscopy of POSS according to the present invention.

After being checked by FT-IR, Solid state $^{29}$Si-NMR is used for further identification. In FIG. 8, the characteristic peak at δ=−68 ppm is of tertiary siloxane the characteristic peak at δ=−109 ppm is of quaternary siloxane (caged structure) while the peak at δ=10 ppm is the characteristic peak of Si—$CH_3$.

Figure 9:
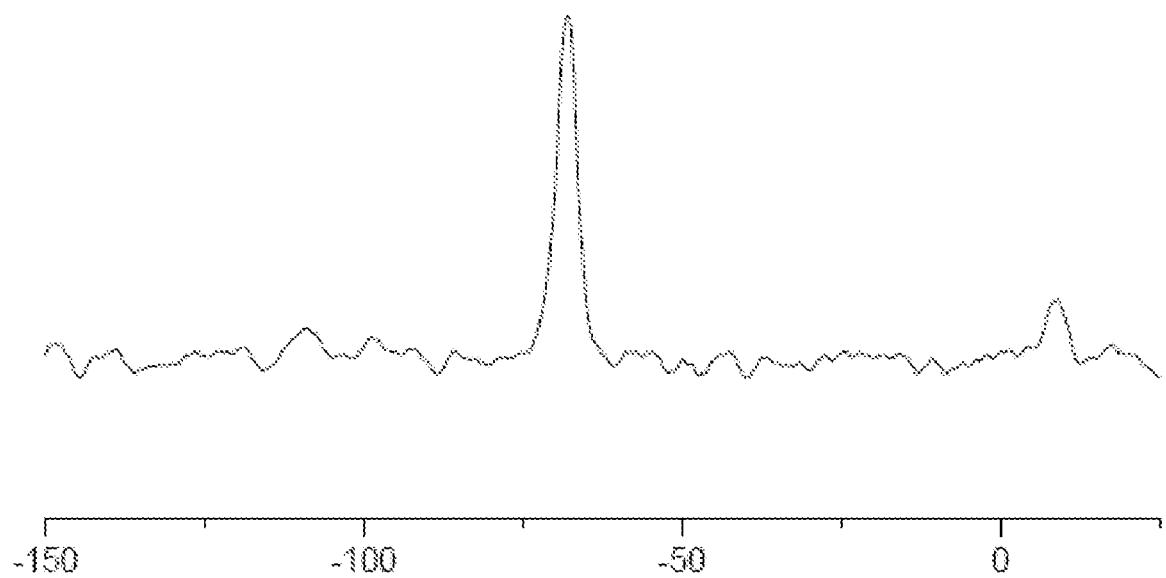
FIG. 9 is a solid state $^{29}$Si-NMR spectroscopy of epoxy resin material containing POSS-epoxy according to the present invention.

FIG. 9 is Solid state $^{29}$Si-NMR spectra of epoxy resin material containing side-chain-tethered caged POSS(POSS-epoxy). It is found that positions of the three characteristic peaks in the figure is the same with that of the characteristic peaks of pure. Thus it is confirmed that Si—O—Si bonding in caged POSS has not been changed and addition of epoxy resin has no effect on structure of caged POSS.

Analysis of Thermal Properties

Glass Transition Temperature (Tg)

In order to learn effects of different ratio of POSS-Epoxy on the glass transition temperature (Tg) of modified epoxy resin, the hardened epoxy resin material containing POSS-epoxy is measured by differential scanning calorimetry (DSC). The dynamic analysis is run at a heating rate of 20° C./min.

Figure 10:
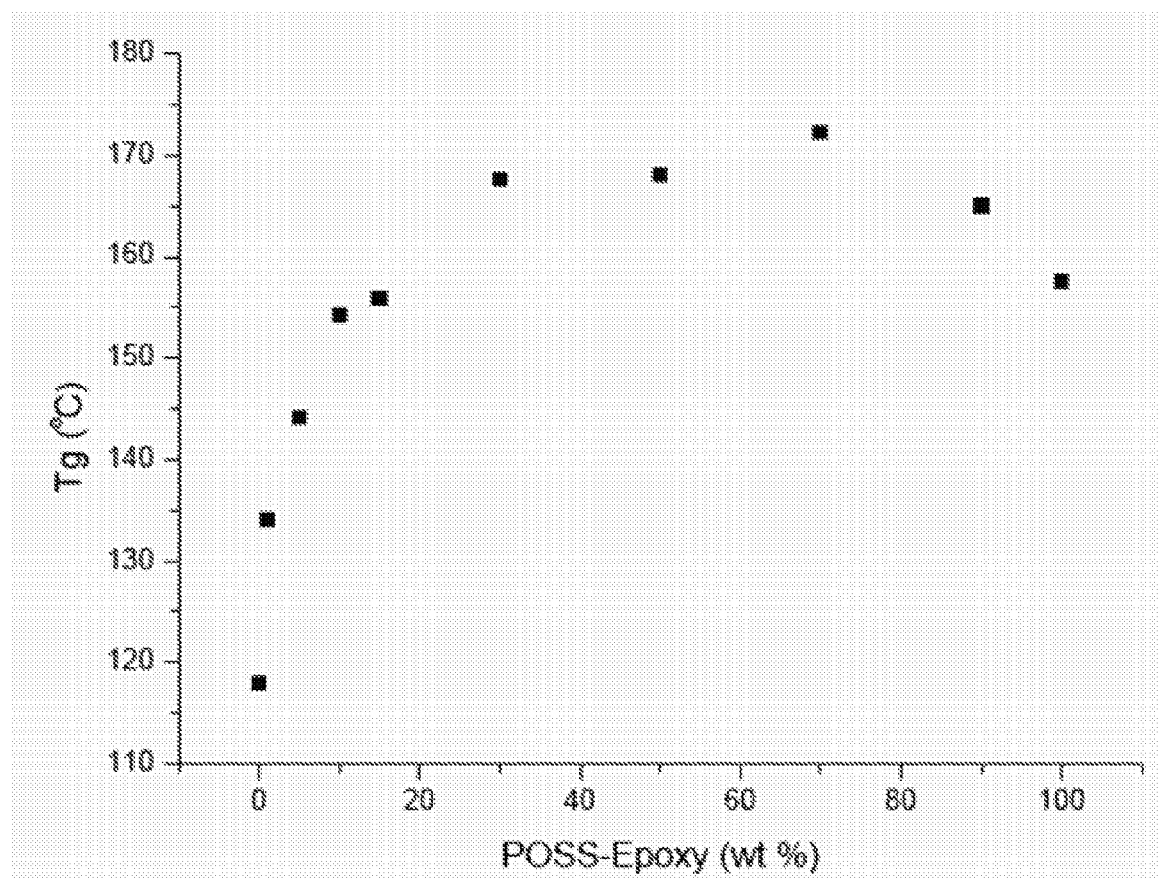
FIG. 10 is epoxy resin material with different weight ratio of POSS-Epoxy versus glass transition temperature of the epoxy resin material according to the present invention.
Figure 11:
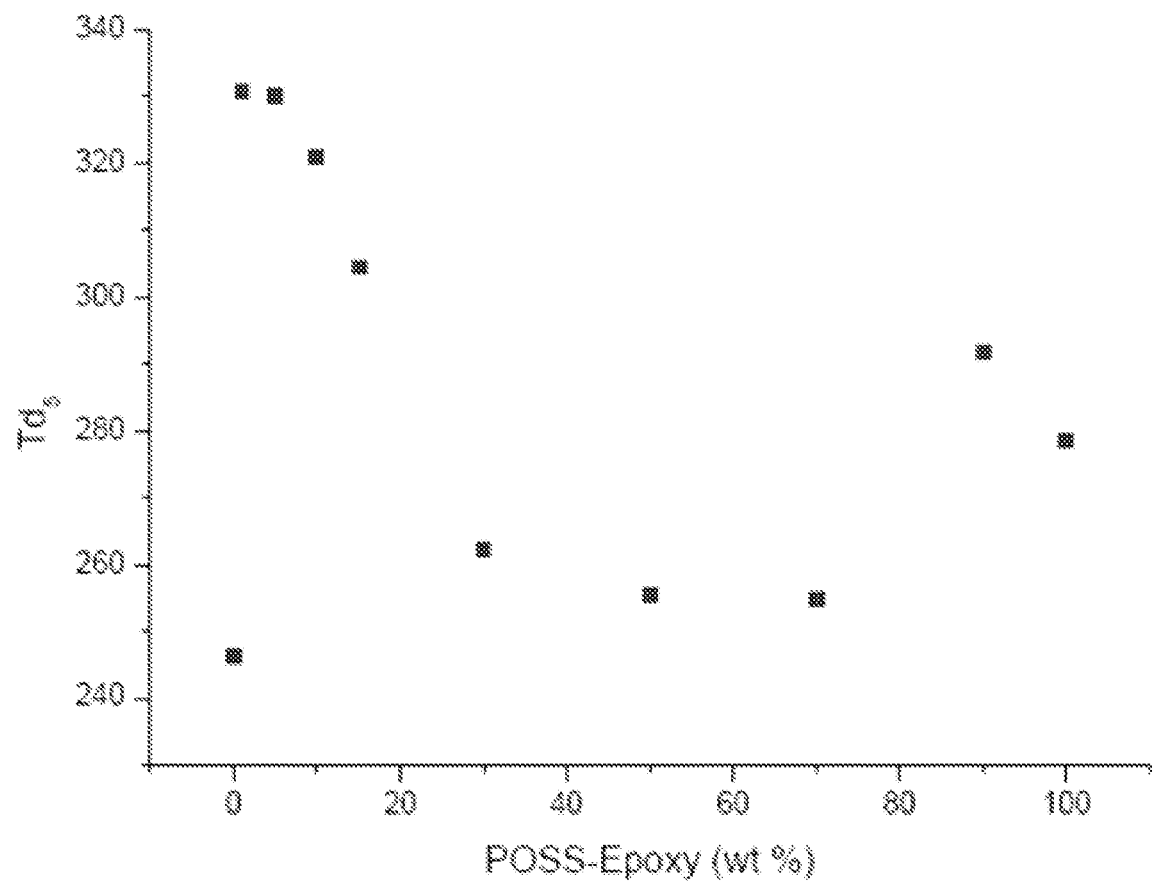
FIG. 11 shows epoxy rein material containing different weight percent of POSS-epoxy versus 5 wt % weight loss temperature according to the present invention.

As shown in FIG. 10, during the glass transition temperature (Tg) tests, it is found that when the amount of POSS in the epoxy material containing side-chain-tethered caged POSS increases, glass transition temperature also increases. This is due to that POSS is a nano-scale reinforcement material (1~2 nm) and addition of POSS generates nanoreinforcement effect. However, when the amount of added POSS reaches certain amount that is a critical point, the glass transition temperature (Tg) starts decreasing fater this point. In the FIG. 10, when the amount of added POSS-Epoxy is less than 70%, Tg of the hybrid material increases along with the amount of the added POSS-Epoxy-the Tg increases from 118° C. to 172° C. (54° C. more). Once the amount of POSS-Epoxy is over 90%, Tg of the hybrid material decreases along with the amount of the added POSS-Epoxy. Tg falls to 157° C. This is due to increasing of free volume and decreasing of crosslink density caused by three-dimensional structure of caged POSS. Thus Tg is decreasing.

Thermogravimetric Analysis (TGA)

The hardened epoxy resin material containing POSS-epoxy is measured by thermogravimetric analysis (TGA) to learn its thermal degradation properties. The test is run with a heating rate of 10/min° C. in nitrogen. The results are in the list 1. The thermostability of POSS-epoxy nanocomposite materials is analyzed by $Td_5$ (5 wt % weight loss temperature) and char yield.

List 1: Thermogravimetric analysis (TGA) results of epoxy resin material containing POSS-epoxy

| DGEBA (%) | POSS-Epoxy (wt %) | POSS (g) | POSS (wt %) | $Td_5$ (° C.) | 700° C.-Char(%) | 800° C.-Char(%) |
|---|---|---|---|---|---|---|
| 100 | 0 | 0.00000 | 0.00 | 246.42 | 15.15 | 14.48 |
| 100 | 1 | 0.00333 | 0.17 | 330.73 | 15.52 | 14.75 |
| 100 | 5 | 0.01667 | 0.79 | 329.98 | 16.89 | 16.20 |
| 100 | 10 | 0.03334 | 1.52 | 320.97 | 17.71 | 17.02 |
| 100 | 15 | 0.05001 | 2.17 | 304.52 | 17.80 | 17.16 |
| 100 | 30 | 0.10002 | 3.85 | 262.29 | 17.89 | 17.28 |
| 100 | 50 | 0.16670 | 5.56 | 255.55 | 18.04 | 17.29 |
| 100 | 70 | 0.23338 | 6.86 | 254.86 | 19.41 | 18.61 |
| 100 | 90 | 0.30006 | 7.90 | 291.84 | 19.92 | 19.21 |
| 0 | 100 | 0.33333 | 16.67 | 278.58 | 22.05 | 21.41 |

It is found from the list 1 that Tdis increased from 246.42° C. to 330.73° C. by addition of 1 wt % POSS-Epoxy. This is due to that that caged POSS is a nano-scale reinforcement material and addition of caged POSS into polymer materials generates nanoreinforcement effect. Compared with epoxy resin without siloxane, the present material has higher thermal decomposition temperature. However, the introduced caged POSS includes NCO segment that is not flame retardant and leads to earlier thermal degradation. Thus along with increasing of the amount of POSS being added, $Td_5$ decreases. Yet compared with pure epoxy resin, $Td_5$ of nanocomposite material added with POSS is still higher. Moreover, when the added POSS achieves higher ratio ((90% POSS-Epoxy/100% POSS-Epoxy)), $Td_5$ increases. It is speculated that there are still some undegraded NCO segments on the polymer chain. After introducing POSS, silicon moves to polymer surface to form a protective layer while being heated and burned. Thus degradation rate of undegraded NCO segments slows down under influence of the protective layer. Therefore, the thermal decomposition temperature increases.

Figure 12:
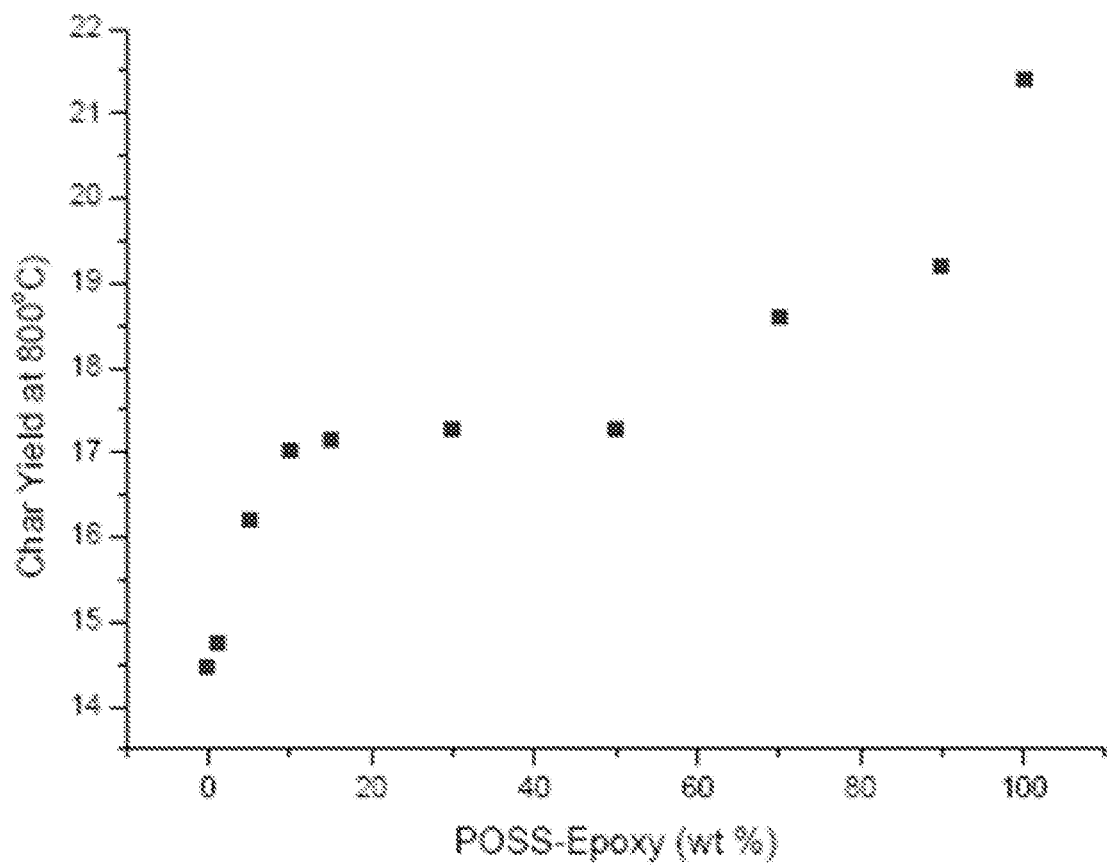
FIG. 12 shows epoxy rein material containing different weight percent of POSS-epoxy versus weight percent of char yield at 800° C. according to the present invention.

Refer to FIG. 12, it is learned that char yield increases along with increasing amount of POSS added. The char yield increases from 14.48 wt % to 21.41 wt % at 800° C. Increasing amount of char provides effective thermal insulation, reduced thermal conductivity, and decreasing amount of combustion gas generated. Thus the material thermostability is improved. The addition of POSS improves both thermal resistance and thermal stability of epoxy resin.

Limiting Oxygen Index (LOI)

Inflaming retarding properties of test pieces formed by epoxy resin material containing POSS-Epoxy are shown in list 2. By introducing inorganic silicide into resin, a $SiO_2$ network with protective function formed on material surface in high temperature combustion. This cause the material has good flame retardant. Refer to FIG. 2, it is found that when the added amount of POSS-Epoxy achieves 50%, the flame retardant is increased to 28 that is over 26—the flame retardant standard required. When the amount is over 70%, LOI decreases. This is due to increasing free volume and poor hardening (crosslinking) caused by caged POSS. Therefore, the flame retardant is getting worse. From tests of various ratio of POSS added, addition of POSS-Epoxy with ratio of 30%, 50% and 70% POSS-Epoxy is preferred.

List 2: LOI of Epoxy Resin Material Containing Different Ratio of POSS-Epoxy

TABLE 5-4

The LOI values of epoxy woth various POSS-Epoxy contents

| (%) | (wt %) | (g) | (wt %) | LOI |
|---|---|---|---|---|
| 100 | 0 | 0 | 0 | 22 |
| 100 | 1 | 0.00333 | 0.17 | 24 |
| 100 | 5 | 0.01667 | 0.79 | 24 |
| 100 | 10 | 0.03334 | 1.52 | 24 |
| 100 | 15 | 0.05001 | 2.17 | 24 |
| 100 | 30 | 0.10002 | 3.85 | 26 |
| 100 | 50 | 0.16670 | 5.56 | 28 |
| 100 | 70 | 0.23338 | 6.86 | 27 |
| 100 | 90 | 0.30006 | 7.90 | 25 |
| 0 | 100 | 0.33333 | 16.67 | 23 |

X-Ray Diffraction (XRD)

Figure 13:
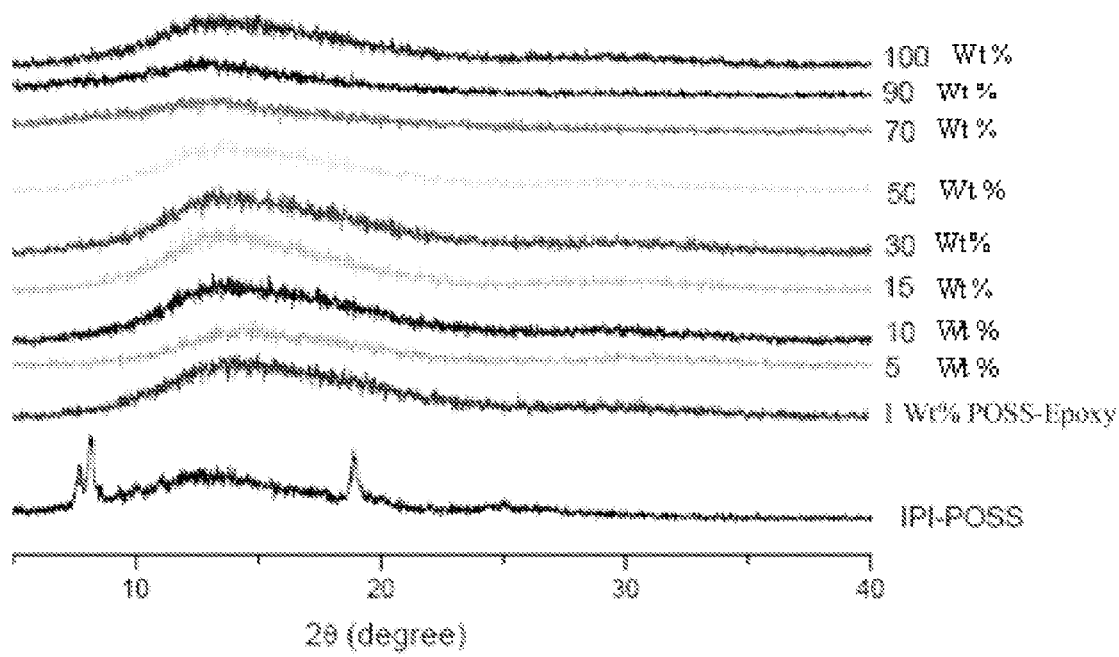
FIG. 13 is a X-ray diffraction spectrum of epoxy rein material containing different weight percent of POSS-epoxy according to the present invention.

Refer to FIG. 13, it is found that characteristic absorption peaks of IPI-POSS are at 2θ=8° (d=5.53 Å) and 2θ=19° (d=2.37 Å). Thus IPI-POSS is not a cubic siloxane and it's rectangular.

From bottom to top, curves of caged POSS, epoxy resin material added with 1 wt %, 5 wt %, 10 wt %, 15 wt %, 30 wt %, 50 wt %, 70 wt %, 90 wt % and 100 wt % POSS-epoxy are shown in FIG. 13. All curves of the epoxy resin material with POSS-epoxy have a characteristic absorption peak at 2θ=12° and the peak is wide and flat. Because diamine curing agent crosslinks with epoxy group of epoxy resin so that the chains are entangled and arrangement of molecular chain is getting chaotic. That means the molecular chain of the products is with properties of noncrystalline. Thus in X-ray diffraction spectra, the characteristic peak is wide and smooth. Moreover, when higher ratio of POSS-epoxy is added into epoxy resin, the two characteristic absorption peaks at 2θ=8° and 2θ=19° don't show up. It is speculated that the prepared epoxy resin material containing POSS-epoxy is homogeneous, without phase separation.

Through a micro-view, the epoxy resin material containing POSS-epoxy is quite homogeneous and is observed by scanning electron microscope to learn its micro-distribution.

Figure 14:
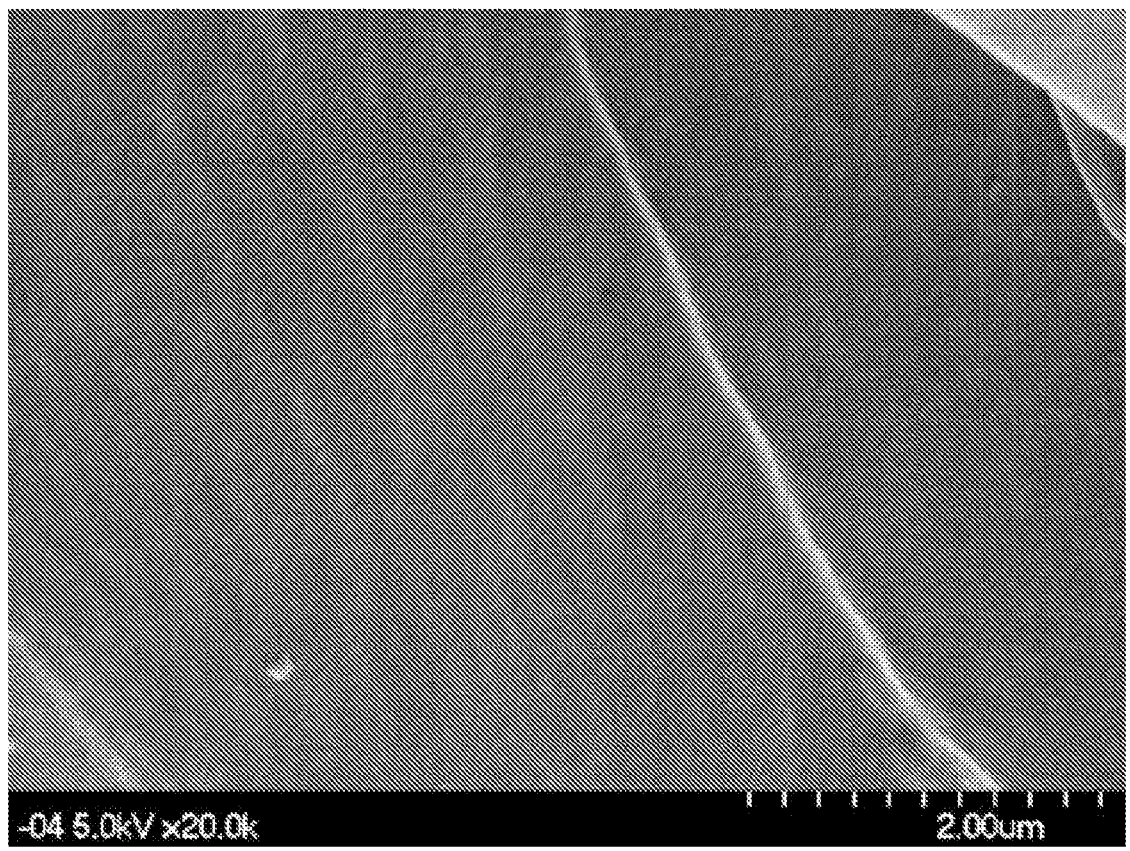
FIG. 14 is a SEM (scanning electron microscopy) image of epoxy rein material added with 5 weight percent of POSS-epoxy according to the present invention.
Figure 15:
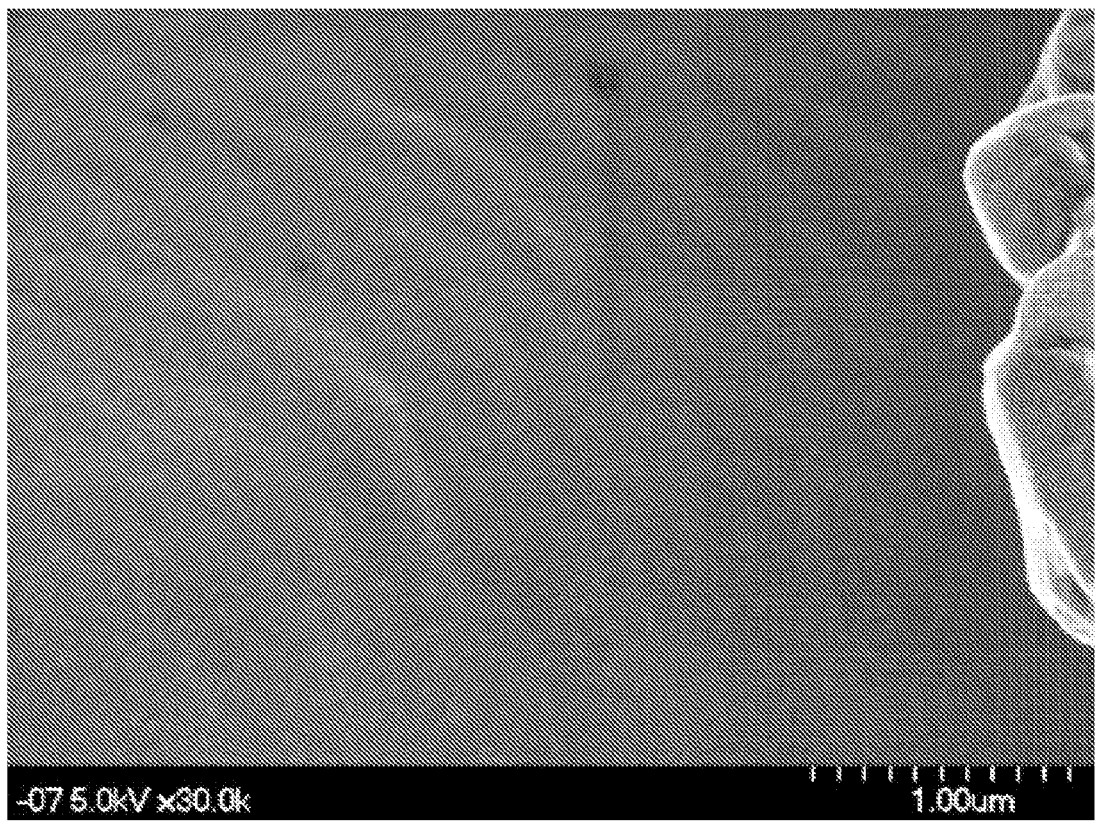
FIG. 15 is a SEM (scanning electron microscopy) image of epoxy rein material added with 15 weight percent of POSS-epoxy according to the present invention.
Figure 16:
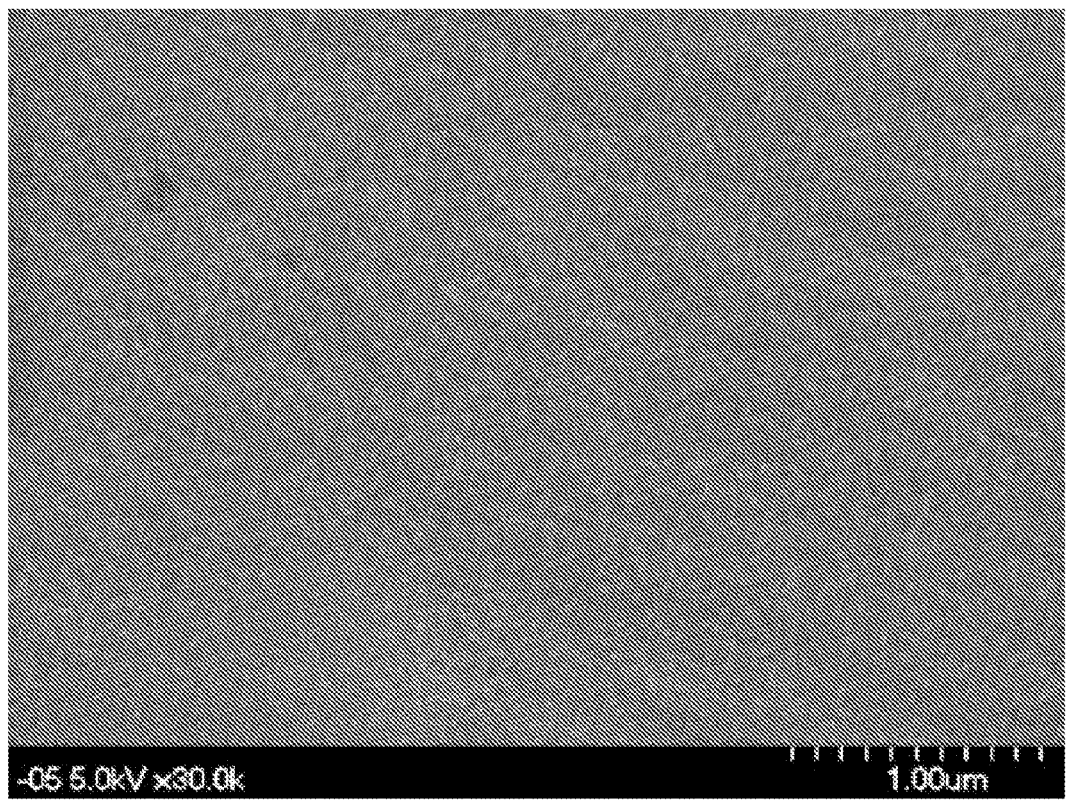
FIG. 16 is a SEM (scanning electron microscopy) image of epoxy rein material added with 50 weight percent of POSS-epoxy according to the present invention.

Refer from FIG. 14 to FIG. 16, these are SEM images of cross-section of the material. Under 20000× magnification, it is found that distribution of inorganic siloxane is quite even. While adding higher ratio (15%-50%) of POSS-Epoxy, observe epoxy resin material containing POSS-Epoxy under 30000× magnification. In FIG. 15 & FIG. 16, it is found that POSS shows good compatibility with epoxy resin. There is no organic/inorganic phase separation caused by introducing of caged POSS.

SEM-EDX Si-Mapping

Figure 17:
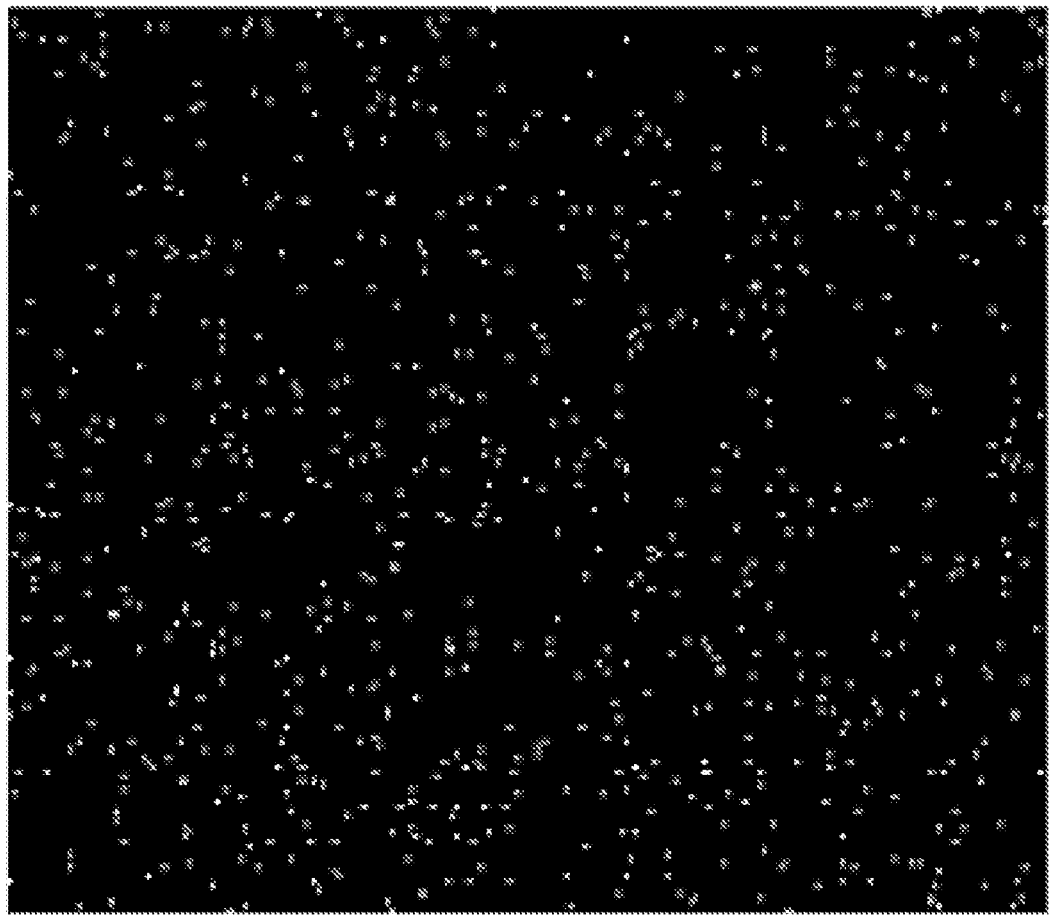
FIG. 17 is SEM-EDX Si-mapping of epoxy resin material containing POSS-epoxy added with 5% POSS-epoxy according to the present invention.
Figure 18:
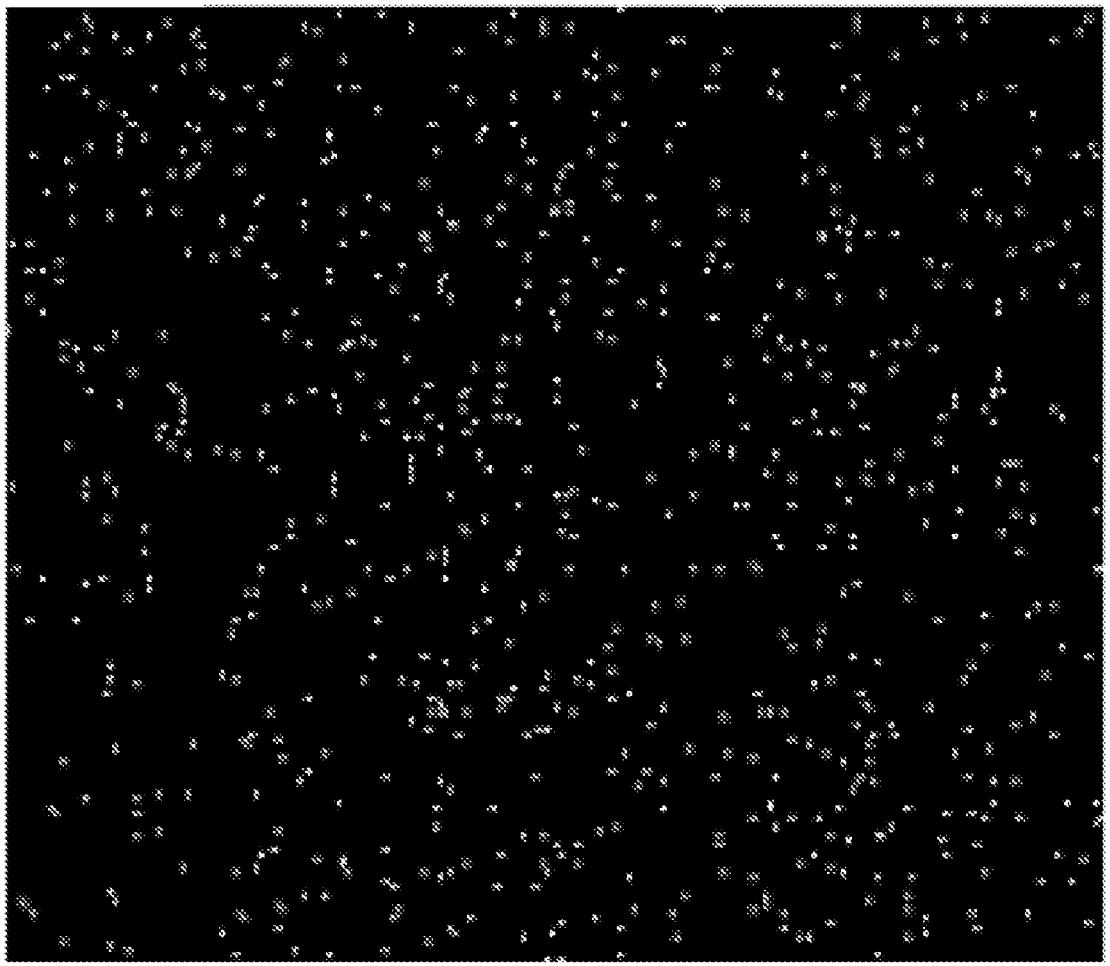
FIG. 18, is SEM-EDX Si-mapping of epoxy resin material containing POSS-epoxy added with 15% POSS-epoxy according to the present invention.
Figure 19:
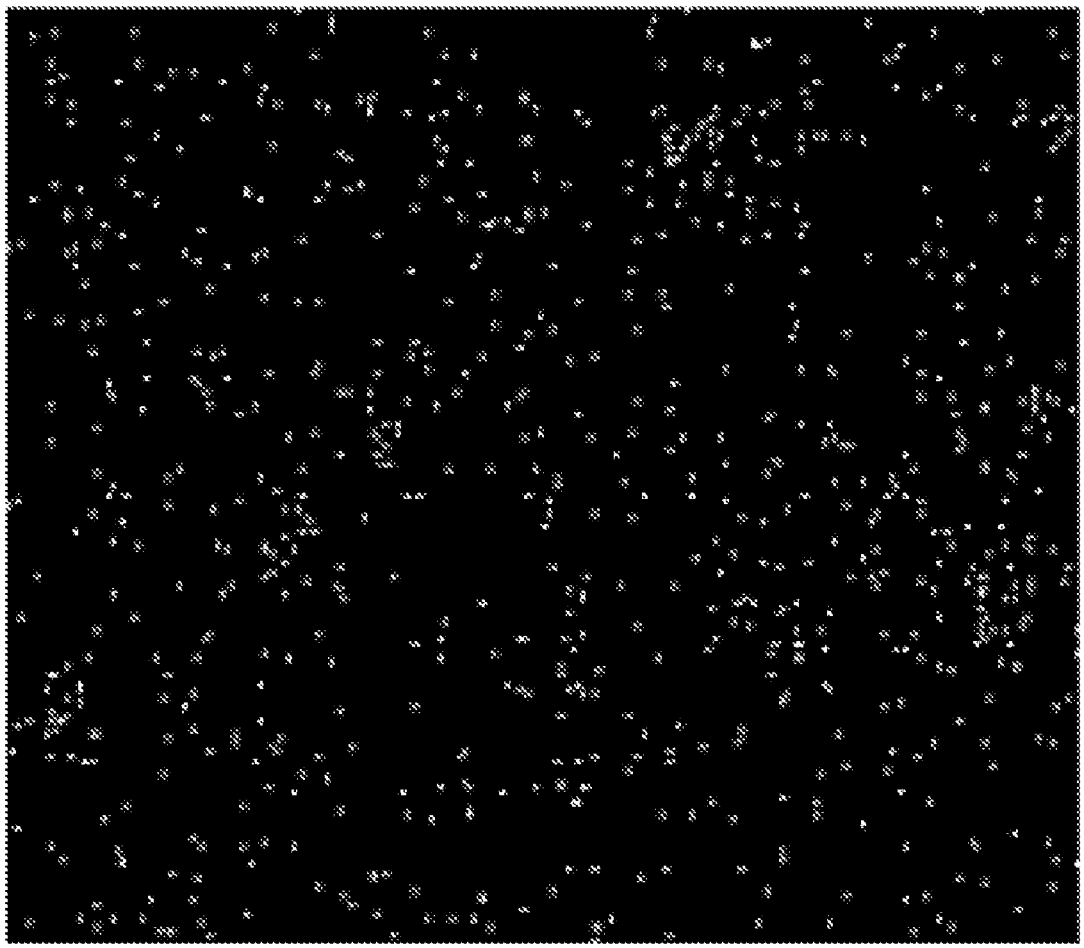
FIG. 19 is SEM-EDX Si-mapping of epoxy resin material containing POSS-epoxy added with 50% POSS-epoxy according to the present invention.

FIG. 17, FIG. 18 & FIG. 19 are Si-mappings of epoxy resin material added with 5%, 15%, 50% POSS-epoxy. Each light spot represents distribution of silicon atom. After analyzing the nano-sacle epoxy resin material with POSS, it is learnt that besides silicon atoms, the siloxane compounds (POSS) in epoxy resin material is also distributed scatteringly and evenly, without aggregation.

Optical Properties Test

Figure 20:
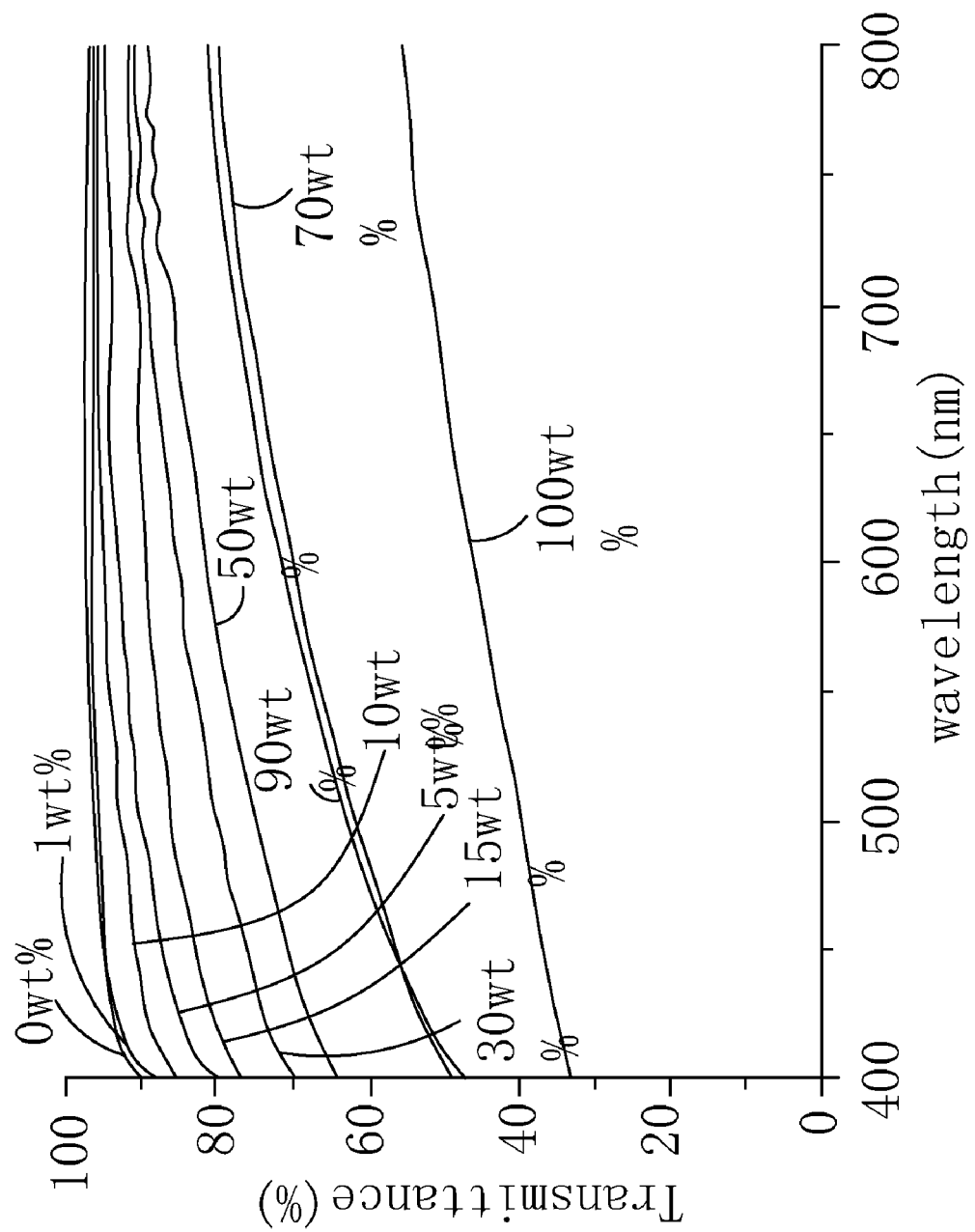
FIG. 20 is an Ultraviolet-visible spectra of epoxy resin material containing different weight percent of POSS-epoxy according to the present invention.

During various optical properties tests, UV/Vis is used to analyze light transmittance of epoxy resin material containing POSS-epoxy, as shown in FIG. 20 and it is found that addition of 50 wt % POSS-Epoxy is a critical point. When the amount of POSS-Epoxy added is over 50 wt %, the epoxy resin material with POSS-epoxy looks opaque. The more amount of POSS-epoxy is added, the more inorganic amount is. Thus compatibility of POSS-Epoxy with epoxy resin is getting poor. Therefore, light transmittance of the epoxy resin material containing POSS-epoxy reduces along with increasing amount of POSS-Epoxy added.

In summary, the POSS-epoxy resin according to the present invention is a new type of reinforcing filler. In analysis of thermal properties, residual volume of thermogravimetric analysis (TGA) increases from 14.48 wt % to 21.41 wt % while comparing with pure epoxy resin, the present material has higher thermal decomposition temperature. As to flame retardant, Limiting Oxygen Index is as high as 28 so that the epoxy resin material containing POSS-epoxy has excellent stability and flame retardant.

Moreover, in structure identification, the result obtained by X-ray shows that epoxy resin material containing POSS-epoxy is non-crystal. Even with higher amount of caged POSS, there is no characteristic peak of POSS. This proves the prepared epoxy resin material containing POSS-epoxy is homogeneous without phase separation.

Through SEM, it's also found that epoxy resin material containing POSS-epoxy has good compatibility and there is no phase separation. In the Si-mapping, it is found that POSS is distributed well.

Among tests of optical properties, it is found that addition of 50 wt % POSS-Epoxy is a critical point. When there is more amount of POSS-Epoxy added, light transmittance of nano-scale composite material is getting poor due to lower compatibility of POSS with epoxy resin.

Furthermore, after studying decomposition dynamics, it is found that decomposition activation energy of epoxy resin material containing POSS-epoxy raises along with increasing amount of POSS-Epoxy added. This means the material provides excellent thermal stability.

The epoxy resin material containing POSS-epoxy raises prepared by a method of the present invention has good thermal properties, good compatibility between organic/inorganic phase. The limiting oxygen index is dramatically increased by addition of only 5~6 wt % POSS. Therefore, epoxy resin material containing POSS-epoxy according to the present invention can be applied to high performance adhesives used in public construction, heat resistant coatings for military armaments and firearms, and fillers for home decoration. Furthermore, epoxy resin material containing POSS-epoxy raises prepared by a method of the present invention also provides excellent optical properties so it can be applied to protective layers for lens of optoelectronics and accessories for monitors.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A preparation method of epoxy resin material containing polyhedral oligomeric silsesquioxane-epoxy (POSS-epoxy) comprising the steps of:
   reacting epoxy resin with caged POSS by adding triethylamine (TEA) as a catalyst of the reaction between the epoxy resin and the cages POSS to form epoxy resin containing side-chain-tethered caged POSS (POSS-epoxy); and
   reacting the epoxy resin with the epoxy resin containing side-chain-tethered caged POSS (POSS-epoxy) to get epoxy resin material containing POSS-epoxy.

2. The method as claimed in claim 1, wherein in the step of reacting epoxy resin with caged POSS to form epoxy resin containing side-chain-tethered caged POSS, the step further comprising a step of dissolving epoxy resin in tetrahydrofuran.

3. The method as claimed in claim 1, wherein in the step of reacting epoxy resin with caged POSS to form epoxy resin containing side-chain-tethered caged POSS, weight ratio of the epoxy resin to the caged POSS is 5:1.

4. The method as claimed in claim 1, wherein in the step of reacting epoxy resin with caged POSS to form epoxy resin containing side-chain-tethered caged POSS, reaction temperature is 60 degrees Celsius.

5. The method as claimed in claim 1, wherein reaction time of the step of reacting epoxy resin with caged POSS to form epoxy resin containing side-chain-tethered caged POSS is 10 hours.

6. The method as claimed in claim 1, wherein in the step of reacting epoxy resin with caged POSS to form epoxy resin containing side-chain-tethered caged POSS, the step further comprising a step of uniform stirring and reflux.

7. The method as claimed in claim 1, wherein reaction temperature of the step of reacting the epoxy resin with the epoxy resin containing side-chain-tethered caged POSS (POSS-epoxy) to get epoxy resin material containing POSS-epoxy is room temperature.

8. The method as claimed in claim 1, wherein time of the step of reacting the epoxy resin with the epoxy resin containing side-chain-tethered caged POSS (POSS-epoxy) to get epoxy resin material containing POSS-epoxy is one hour.

9. The method as claimed in claim 1, wherein in the step of reacting the epoxy resin with the epoxy resin containing side-chain-tethered caged POSS (POSS-epoxy) to get epoxy resin material containing POSS-epoxy, the step further comprising a step of adding a hardener.

10. The method as claimed in claim 9, wherein the hardener is 4,4'-methylenedianiline.

11. The method as claimed in claim 9, wherein the method comprising a further step of being set at room temperature for one day after the step of adding the hardener.

12. The method as claimed in claim 11, wherein the method comprising a further step of heating after the step of being set at room temperature for one day.

13. A preparation method of epoxy resin material containing polyhedral oligomeric silsesquioxane-epoxy (POSS-epoxy) comprising the steps of:

reacting epoxy resin with caged POSS to form epoxy resin containing side-chain-tethered caged POSS (POSS-epoxy), wherein the caged POSS is isocyanatopropyldimethylsilyl-isobutyl-P0SS; and reacting the epoxy resin with the epoxy resin containing side-chain-tethered caged POSS (POSS-epoxy) to get epoxy resin material containing POSS-epoxy.

\* \* \* \* \*